US007320124B2

(12) United States Patent
Horikawa

(10) Patent No.: US 7,320,124 B2
(45) Date of Patent: Jan. 15, 2008

(54) APPARATUS AND METHOD FOR ANALYZING AND DISPLAYING OPERATIONS OF COMPUTER AND COMPUTER PROGRAM FOR THE SAME

(75) Inventor: Takashi Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 696 days.

(21) Appl. No.: 10/295,950

(22) Filed: Nov. 18, 2002

(65) Prior Publication Data

US 2003/0145125 A1 Jul. 31, 2003

(30) Foreign Application Priority Data

Nov. 19, 2001 (JP) .............................. 2001-353799

(51) Int. Cl.
*G06F 9/44* (2006.01)
*G06F 9/45* (2006.01)
*G06F 9/46* (2006.01)
*G06F 3/00* (2006.01)

(52) U.S. Cl. ................... 717/127; 717/125; 717/131; 717/155; 719/311; 719/312; 719/313; 719/314; 719/316

(58) Field of Classification Search ........ 717/124–138, 717/154–157
See application file for complete search history.

(56) References Cited

U.S. PATENT DOCUMENTS 5,748,878 A * 5/1998 Rees et al. .................... 714/38

6,202,199 B1 * 3/2001 Wygodny et al. .......... 717/125
6,230,313 B1 * 5/2001 Callahan et al. ........... 717/128

FOREIGN PATENT DOCUMENTS

| JP | 60-11948 | 1/1985 |
| JP | 5-204664 | 8/1993 |
| JP | 6-259209 | 9/1994 |
| JP | 7-225728 | 8/1995 |

OTHER PUBLICATIONS

Japanese Office Action issued Aug. 3, 2004 (w/ English translation of relevant portion).
Japanese Office Action issued Dec. 9, 2003 (w/ English translation of relevant portion).

* cited by examiner

*Primary Examiner*—Chuck Kendall
(74) *Attorney, Agent, or Firm*—Dickstein Shapiro LLP

(57) ABSTRACT

A novel apparatus and method for analyzing and displaying the operation of a computer is provided, that can display a timing chart with which the relationship between transmission processes and reception processes, each relating to inter-process communications, can be easily grasped. The apparatus includes a measuring device for measuring and collecting as chronological event trace data a software event occurring within a computer to be measured, an analyzer for analyzing the operation of the computer based on the event trace data collected by the measuring device, and a display for manifesting the operation of the computer analyzed by the analyzer.

7 Claims, 6 Drawing Sheets

FIG. 5

| SOFTWARE EVENT | ADDITIONAL INFORMATION |
|---|---|
| RESUME PROCESS | PROCESS NUMBER (PROCESS ID) |
| SAVE PROCESS | PROCESS NUMBER (PROCESS ID) |
| TRANSMIT INTER-PROCESS COMMUNICATIONS (SEND) | COMMUNICATION PATH NUMBER (COMMUNICATION PATH ID) |
| RECEIVE INTER-PROCESS COMMUNICATIONS (RECEIVE) | COMMUNICATION PATH NUMBER (COMMUNICATION PATH ID) |

FIG. 6

| TIME 1 | EVENT | ADDITIONAL INFORMATION |
|---|---|---|
| 0 | RESUME | 100 |
| 1000 | SEND | 10 |
| 1010 | SAVE | 100 |
| 1020 | RESUME | 200 |
| 1030 | RECEIVE | 10 |
| 2000 | SEND | 20 |
| 2010 | SAVE | 200 |
| 2020 | RESUME | 100 |
| 2030 | RECEIVE | 20 |
| 3000 | SAVE | 100 |

TIME

FIG. 7

PROCESS OPERATION DATA OF
CLIENT PROCESS (pid = 100)

| TIME | EVENT |
|---|---|
| 0 | RESUME |
| 1000 | SEND |
| 1010 | SAVE |
| 2020 | RESUME |
| 3000 | SAVE |

TIME →

PROCESS OPERATION DATA OF
SERVER PROCESS (pid = 200)

| TIME | EVENT |
|---|---|
| 1020 | RESUME |
| 2010 | SEND |

TIME →

FIG. 8

| TRANSMISSION | | RECEPTION | | COMMUNICATION PATH |
|---|---|---|---|---|
| PROCESS | TIME | PROCESS | TIME | |
| 100 | 1000 | 200 | 1030 | 10 |
| 200 | 2000 | 100 | 2030 | 20 |

APPARATUS AND METHOD FOR ANALYZING AND DISPLAYING OPERATIONS OF COMPUTER AND COMPUTER PROGRAM FOR THE SAME

BACKGROUND OF THE INVENTION

The present invention relates to an apparatus and method for analyzing and displaying the operation of a computer.

The event trace technique, one of computer operation measuring techniques, can recreate in detail the operational history of a computer to be measured because events occurring within the computer are recorded in chronological order.

The tools, each for graphically displaying the operation of a computer, which fully use that advantage, have been developed. For example, there are WindView (http://www.windriver.com/products/html/windview2_ds.html) and Linux Trace Toolkit (http://www.opersys.com/LTT/screenshots.html).

These tools arrange processes within a system to be measured in the vertical direction of the vertical axis, with the horizontal axis taken in the direction of time, and graphically display the periods during which the processes are operating. In the timing diagrams displayed by those tools, the line segment in the horizontal direction represents the period during which the process is operating. It is may be considered that horizontal line segment is identical to the line segment displayed based on the process operation display data of the present invention. In the case of WindView, the line segment in the vertical direction represents process changeover. That is, the X-coordinate represents the time when a process has changed. In Y-coordinates at both ends of the line segment, one end corresponds to the position of the previously operated (or saved) process while the other end corresponds to the position of the process which begins to operate (to resume) newly. In the case of Linux Trace Toolkit, the time slot during which the line segment operates in the user mode is displayed at the position of the process. In the kernel mode, all processes are collectively displayed at the bottom. Hence, the line segment in the vertical direction is used to show transition of the user mode and transition of the kernel mode.

Therefore, the vertical line in the timing chart displayed by those tools represents operational results only but does not represent logical relationships between processes. For that reason, when plural processes are shown so as to perform operations cooperatively while performing inter-process communications, it is difficult to grasp the relationships between the processes. Particularly, when the system operation that processes plural transactions in parallel is displayed, the vertical lines representing the operational results are drawn independently of the logical relationships of processes. Hence, it is impossible to grasp the logical relationships of processes.

SUMMARY OF THE INVENTION

The present invention is made to solve the above-mentioned problems in the prior arts.

An object of the present invention is to provide a novel apparatus and method for analyzing and displaying computer's operations, that can display the timing chart with which the relationships between transmission processes and reception processes, each relating to inter-process communications, can be easily grasped.

Another object of the present invention is to provide a computer program for achieving the above-mentioned objects.

In order to achieve the above-mentioned objects, the present invention basically employs the following technical configurations.

According to an aspect of the present invention, an apparatus for analyzing and displaying an operation of a computer, comprises measuring means for measuring and collecting as chronological event trace data a software event occurring within a computer to be measured; analyzing means for analyzing the operation of the computer based on the event trace data collected by the measuring means; and display means for manifesting the operation of the computer analyzed by the analyzing means; the measuring means detecting both a first event of changing processes on said computer and a second event of performing inter-process communications and then collecting said first and second events as chronological information; the analyzing means creating data displaying a process operation, the data representing a run period and a non-run period of each process, from the first event, and creating inter-process communications data from the second event, the inter-process communications data being formed of a pair of a transmission process and a transmission time and a pair of a reception process and a reception time in inter-process communications; the display means manifesting the run period and the non-run period of each process in a chronological order and manifesting, in one-to-one correspondence, a point represented with a transmission process and a transmission time and a point represented with a reception process and a reception time in each inter-process communications.

In another aspect of the present invention, a method for analyzing and displaying an operation of a computer, comprises the steps of measuring and collecting as chronological event trace data a software event occurring within a computer to be measured; analyzing the operation of the computer based on the event trace data collected in the measuring step; and manifesting the operation of the computer analyzed in the analyzing step; the measuring step further including the steps of detecting both a first event of changing processes on the computer and a second event of performing inter-process communications and then collecting the first and second events as chronological information; the analyzing step further including the steps of creating data displaying a process operation, the data representing a run period and a non-run period of each process, from the first event, and creating inter-process communications data from the second event, the inter-process communications data being formed of a pair of a transmission process and a transmission time and a pair of a reception process and a reception time in inter-process communications; the manifesting step further including the steps of the run period and the non-run period of each process in a chronological order and manifesting, in one-to-one correspondence, a point represented with a transmission process and a transmission time and a point represented with a reception process and a reception time in each inter-process communications.

In another aspect of the present invention, a program for analyzing and displaying an operation of a computer, the program being executed by a computer, comprises the steps of measuring and collecting as chronological event trace data a software event occurring within a computer to be measured; analyzing the operation of the computer based on the event trace data collected in the measuring step; and manifesting the operation of the computer analyzed in the analyzing step; the program further including the steps of detecting both a first event of changing processes on the computer and a second event of performing inter-process communications and then collecting the first and second events as chronological information; creating data displaying a process operation, the data representing a run period and a non-run period of each process, from the first event, and creating inter-process communications data from the second event, the inter-process communications data being formed of a pair of a transmission process and a transmission time and a pair of a reception process and a reception time in inter-process communications; and manifesting the run period and the non-run period of each process in a chronological order and manifesting, in one-to-one correspondence, a point represented with a transmission process and a transmission time and a point represented with a reception process and a reception time in each inter-process communications.

In another aspect of the present invention, an apparatus for analyzing and displaying software events occurring within a computer which executes a program comprises a probe for detecting a first event changing a process and a second event performing inter-process communications while the program is being executed; means for collecting as chronological information both a first event of changing the detected process and a second event of performing inter-process communications; an analyzer for creating process operation data and inter-process communications data, based on the chronological information collected, the process operation data representing a run period and a non-run period of each process, the inter-process communications data representing a transmission process, a transmission time, a pair of a reception process and a reception time in inter-process communications; and a display for manifesting a run period and a non-run period in each process based on the process operation data created wherein a horizontal axis acts as a time axis and wherein processes are arranged in the direction of a vertical axis and wherein a line is drawn between a time a process is resumed and a time a process is saved and for manifesting transmission and reception between processes in parallel form based on the inter-process communications data created wherein an arrow line is drawn between a transmission time of a transmission process and a reception time of a reception process.

In another aspect of the present invention, a method for analyzing and displaying software events occurring within a computer which executes a program comprises the steps of detecting a first event changing a process and a second event performing inter-process communications while the program is being executed; collecting as chronological information both a first event of changing the detected process and a second event of performing inter-process communications; creating process operation data and inter-process communications data, based on the chronological information collected, the process operation data representing a run period and a non-run period of each process, the inter-process communications data representing a transmission process, a transmission time, a pair of a reception process and a reception time in inter-process communications; manifesting a run period and a non-run period in each process based on the process operation data created wherein a horizontal axis acts as a time axis and wherein processes are arranged in the direction of a vertical axis and wherein a line is drawn between a time a process is resumed and a time a process is saved; and manifesting transmission and reception between processes in parallel form based on the inter-process communications data created wherein an arrow line is drawn between a transmission time of a transmission process and a reception time of a reception process.

In another aspect, the present invention is characterized by a program for making an apparatus for analyzing and displaying software events occurring within a computer which executes a program, function as a probe for detecting a first event changing a process and a second event performing inter-process communications while the program is being executed; means for collecting as chronological information both a first event of changing the detected process and a second event of performing inter-process communications; an analyzer for creating process operation data and inter-process communications data, based on said chronological information, the process operation data representing a run period and a non-run period of each process, the inter-process communications data representing a transmission process, a transmission time, a pair of a reception process and a reception time in inter-process communications; and a display for manifesting a run period and a non-run period in each process based on the process operation data created wherein a horizontal axis acts as a time axis and wherein processes are arranged in the direction of a vertical axis and wherein a line is drawn between a time a process is resumed and a time a process is saved and for manifesting transmission and reception between processes in parallel form based on the inter-process communications data created wherein an arrow line is drawn between a transmission time of a transmission process and a reception time of a reception process.

In further another aspect, the present invention is characterized by a recording medium wherein the program described above is stored.

BRIEF DESCRIPTION OF THE DRAWINGS

This and other objects, features and advantages of the present invention will become more apparent from the following detailed description taken in conjunction with the attached drawings, in which:

FIG. 5 is a table listing sets of event data detected by a software probe embedded in the operating system of a computer to be measured;

FIG. 6 is a table showing an example of event data;

FIG. 7 is a table listing process operation display data obtained from the event data of FIG. 6;

FIG. 8 is a table listing inter-process communications display data obtained from the event data of FIG. 6;

DESCRIPTION OF THE EMBODIMENTS

An apparatus and method for analyzing and displaying the operation of a computer, according to the present invention, will be described below in detail by referring to the attached drawings.

Figure 1:
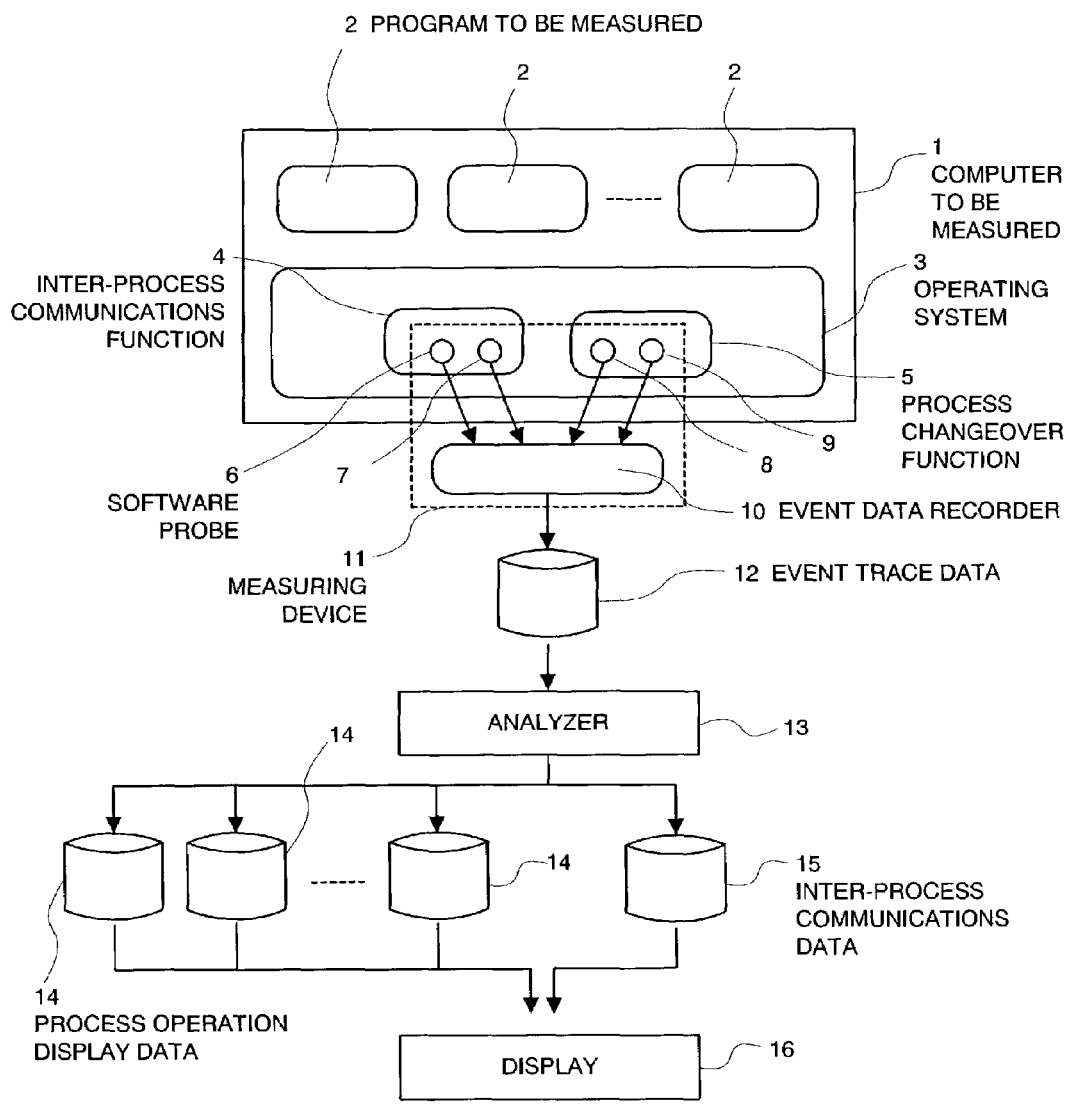
FIG. 1 is a block diagram illustrating the configuration of an apparatus for analyzing and displaying computer's operations, according to the present invention.

Referring to FIG. 1, a measuring device 11 comprises software probes 6 to 9 embedded in the operating system 3 of a computer 1 to be measured, and an event data recorder 10 that records event data detected with the software probes 6 to 9.

The measuring device 11 records both an event changing a process (or a process changeover event) and an event performing communications between processes (or an inter-process communications event), which occur with the operation of the computer 1, together with the occurrence time of them. Thus, the measuring device 11 creates event trace data 12 in chronological order.

An analyzer 13 receives event trace data 12 and creates operation data in each process (or process operation display data 14) based on process changeover event recorded therein. The process operation display data 14 represents a (program) run period and a (program) non-run period in each process.

Similarly, the analyzer 13 creates data on communications between processes (or inter-process communications data 15) from inter-process communications event. The inter-process communications data 15 represents a pair of a transmission process and a transmission time thereof, and a pair of a reception process and a reception time thereof, of inter-process communications, in one-to-one correspondence.

The display 16 displays the run period and the non-run period in each process along the time axis, based on process operation display data 14 created in each process. In each inter-process communications, the display 16 also displays the correspondence relationship of two points connected to each other with line on the display screen based on inter-process communications data 15. One point is represented with a transmission process and the transmission time thereof and the other point is represented with a reception process and the reception time thereof.

Next, the basic operation of the above-mentioned configuration will be explained below.

The basic operation of the measuring device 11 is shown below.

First, the computer 1 executes the measuring object program 2. Thus, every time when the program 2 is executed, each of the software probes 6 to 9 detects event data. The detected event data is sent to the event data recorder 10. The event data recorder 10 sequentially collects and records information representing event data and the time when the event data has been output and thus creates measurement data.

Figure 2:
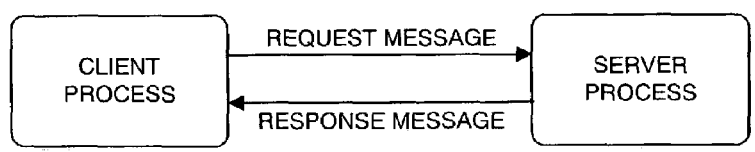
FIG. 2 is a diagram explaining the apparatus configuration of the present invention.
Figure 3:
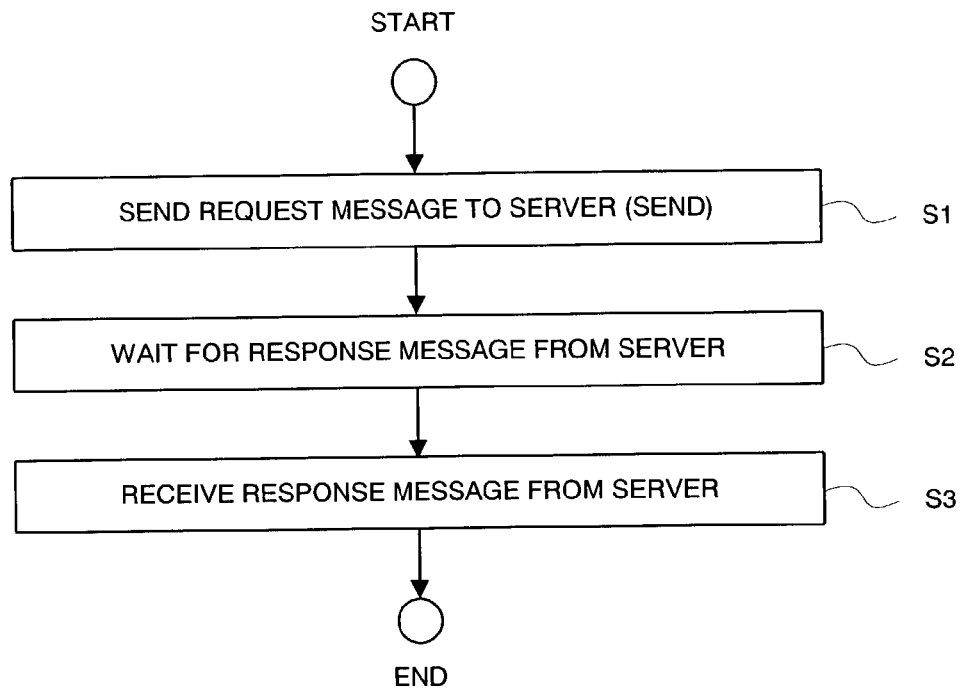
FIG. 3 is a flowchart of a client program according to the present invention.
Figure 4:
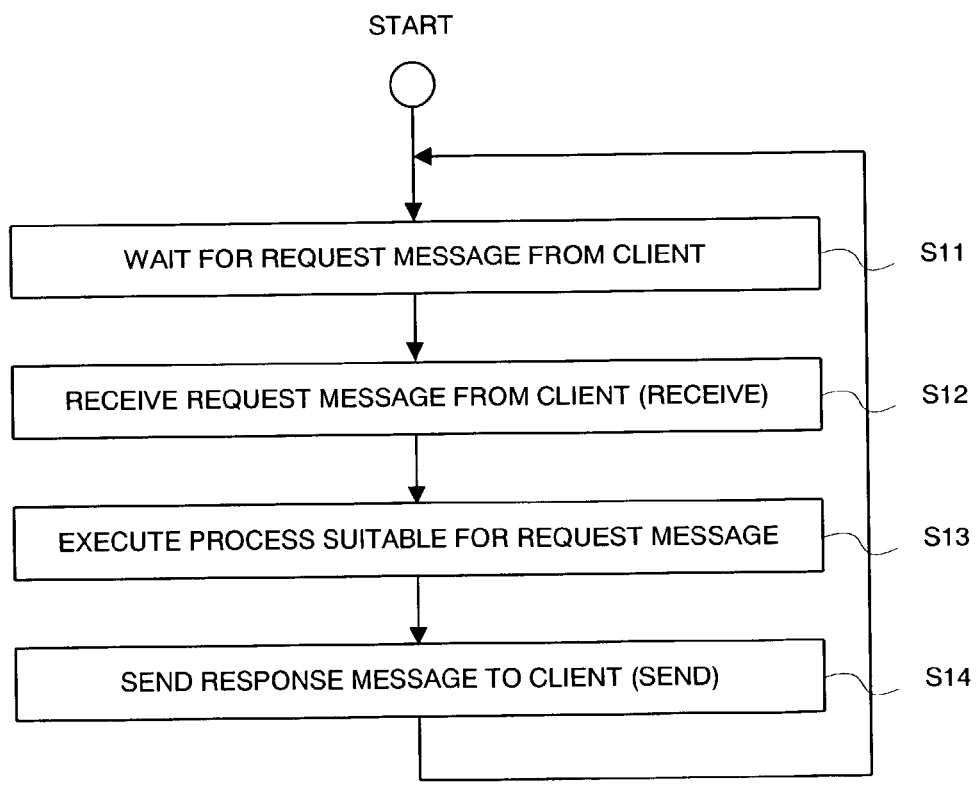
FIG. 4 is a flowchart of a server program according to the present invention.

FIG. 3 is a flowchart of the operation of a client program in the present embodiment. FIG. 4 is a flowchart of the operation of a server program in the present embodiment. The sever program, as shown in FIG. 2, runs to repeat the steps of receiving and processing a process request from a client and then returning the result. There is no end point of execution of the program.

FIG. 5 is a table listing event data detected with the software probes 6 to 9 embedded within the operating system 3 of the computer 1 to be measured. The event data is formed of a software event for identifying an occurrence event and additional information according to the event. The additional information to Save or Resume of the process corresponds to the process number (process ID) for identifying a process to be handled. The additional information to Send or Receive of inter-process communications is the communication path number (communications path ID) for identifying a communication path in inter-process communications.

FIG. 6 shows an example of event trace data obtained by measuring the computer 1 by means of the measuring device 11 when the client process and the server process are operated. The process ID 100 corresponds to a client process. The process ID 200 corresponds to a server process.

When receiving the event trace data, shown in FIG. 6, the analyzer 13 recognizes that both the process ID 100 and the process ID 200 have been executed in the computer 1 and creates the process operation data shown in FIG. 7. Similarly, the analyzer 13 recognizes that the inter-process communications has been performed through the communication path ID 10 and the communication path ID 20. Thus, the analyzer 13 creates inter-process communications data formed of a pair of a transmission process and the occurrence time thereof and a pair of a reception process and the occurrence time thereof (as shown in FIG. 8).

Figure 9:
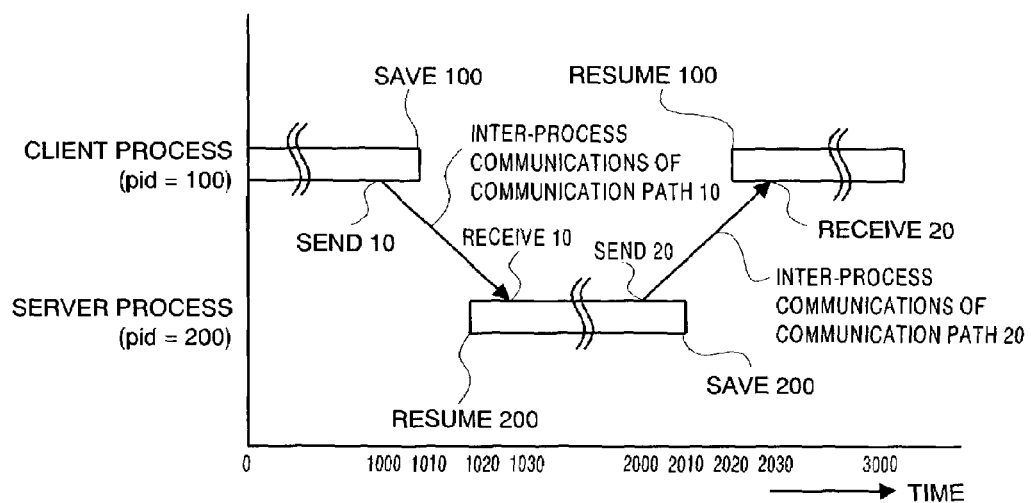
FIG. 9 is a diagram showing how the operation of a computer to be measured is displayed according to the present invention.

FIG. 9, which is a timing chart manifested on the display 16, shows the operation of the computer 1 to be measured.

The display 16 manifests run periods of respective processes in accordance with process operation data, shown in FIG. 7. In this case, time is taken on the horizontal axis while each process is arranged in the direction of the vertical axis. That is, the run period is shown with the line drawn between the time a process is resumed and the time the process is saved, based on the process operation data.

Moreover, an arrow is drawn from the transmission time of a transmission process to the reception time of a reception process in each inter-process communications, based on the inter-process communications data shown in FIG. 8. Thus, the transmission and the reception of each inter-process communication are displayed in a one-to-one correspondence.

Figure 10:
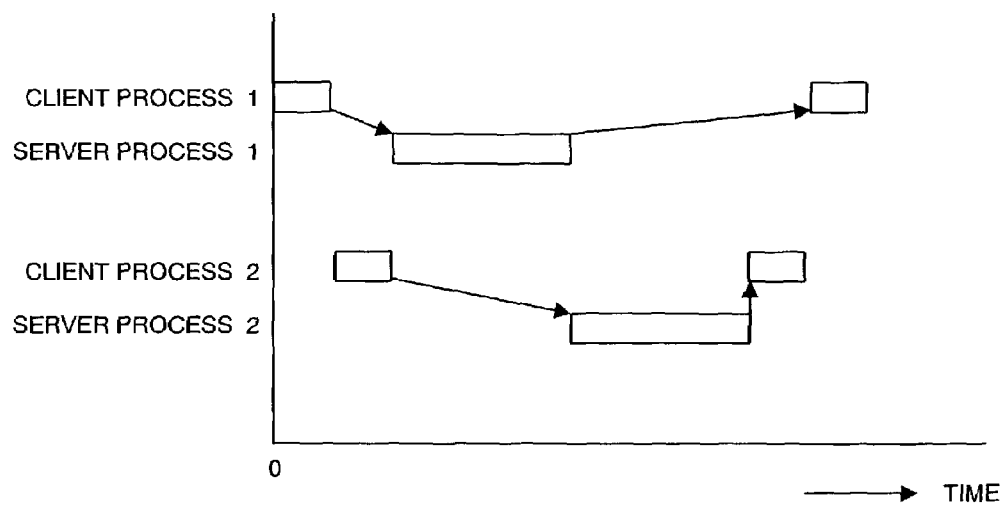
FIG. 10 is another diagram showing how the operation of a computer to be measured is displayed according to the present invention.
Figure 11:
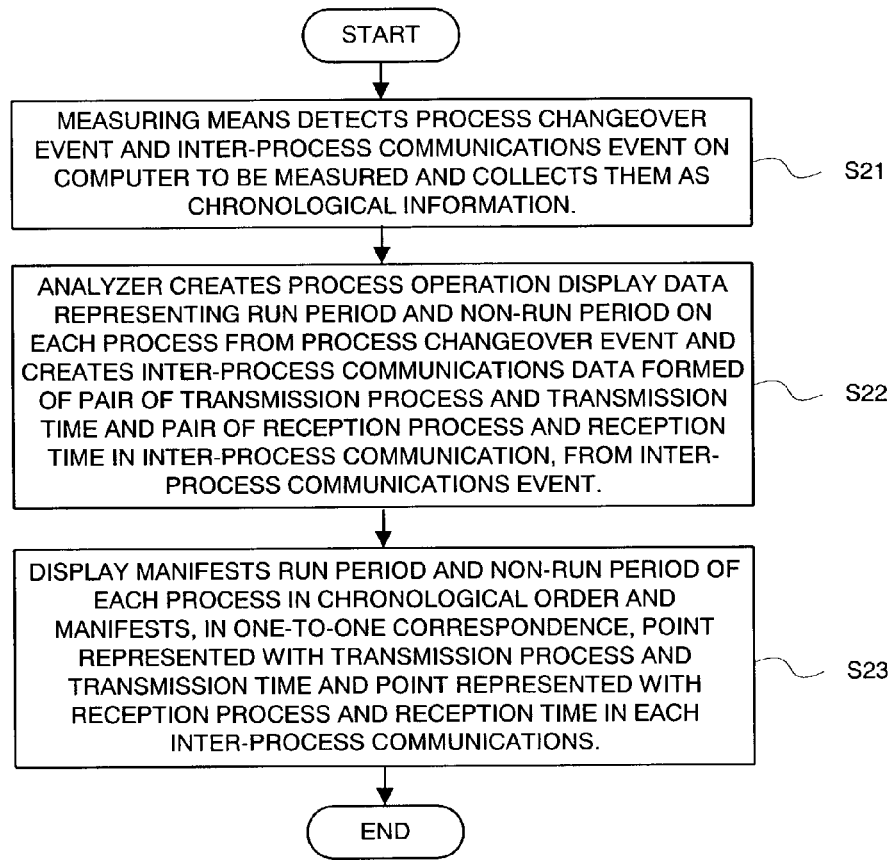
FIG. 11 is a flowchart showing the operation of the apparatus according to the present invention.
Figure 12:
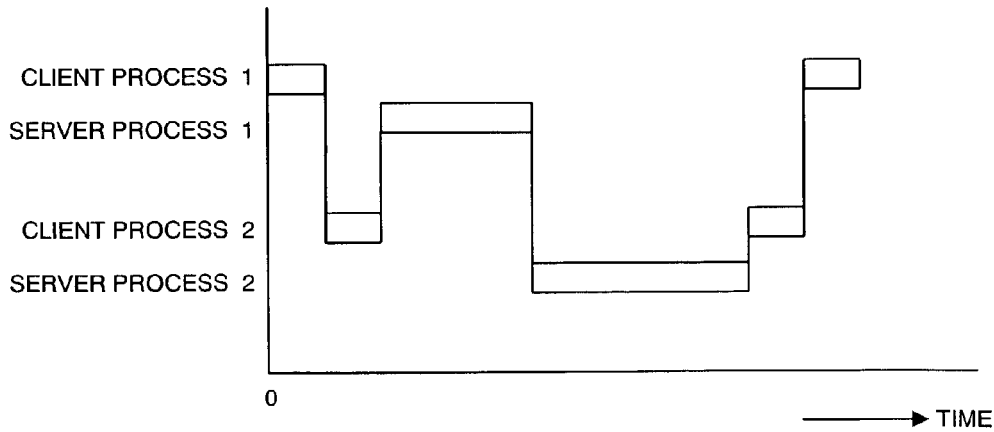
FIG. 12 is a diagram showing a conventional display method.

FIG. 10 shows an example of the system operation when both the client process and the server process are operated in parallel, as shown in FIG. 9. The display example of the present invention shown in FIG. 10 is compared with the display example of the conventional tool shown in FIG. 12, in which process changeover is shown as the vertical line. FIG. 10 explicitly shows the logical relationship between two sets of processes. However, in the conventional tool, it is understood that the logical relationship between processes is unclear. The present invention is characterized in that the relationships between processes can be clearly manifested even when plural processes are operated in parallel.

As described above, according to the apparatus and method for analyzing and displaying the operation of a computer, of the present invention, the relationship between the transmission process and the reception process in inter-process communications can be easily grasped.

The subject matter of the present invention is to have the steps of creating inter-process communications data from inter-process communications event recorded on event trace data as well as process operation data from a process changeover event recorded on event trace data are created and then manifesting two sets of the display data on the display 16. Various modifications would be possible without departure from the subject matter of the present invention. In the above-mentioned embodiment, sets of inter-process communications data are put together as one file. However, the method of creating inter-process communications data for each transmission process or for each reception process may be covered by the present invention.

The entire disclosure of Japanese Patent Application No. 2001-353799 filed on Nov. 19, 2001 including specification, claims, drawings and summary are incorporated herein by reference in its entirely.

What is claimed is:

1. An apparatus for analyzing and displaying an operation of a computer, the apparatus comprising:
    a measuring module measuring and collecting as chronological event trace data a software event occurring within a computer to be measured;
    an analyzing module analyzing the operation of said computer based on the event trace data collected by said measuring module; and
    a display manifesting the operation of said computer analyzed by said analyzing module;
    said measuring module detecting both a first event of changing processes on said computer and a second event of performing inter-process communications and then collecting said first and second events as chronological information;
    said analyzing module creating data displaying a process operation, said data representing a run period and a non-run period of each process, from said first event, and creating inter-process communications data from said second event, said inter-process communications data being formed of a pair of a transmission process and a transmission time and a pair of a reception process and a reception time in inter-process communications;
    said display manifesting the run period and the non-run period of each process in a chronological order and manifesting, in one-to-one correspondence, a point represented with a transmission process and a transmission time and a point represented with a reception process and a reception time in each inter-process communications.

2. A method for analyzing and displaying an operation of a computer, the method comprising:
    measuring and collecting as chronological event trace data a software event occurring within a computer to be measured;
    analyzing the operation of said computer based on the event trace data collected in said measuring act; and
    manifesting the operation of said computer analyzed in said analyzing act;
    said measuring act further including detecting both a first event of changing processes on said computer and a second event of performing inter-process communications and then collecting said first and second events as chronological information;
    said analyzing act further including:
        creating data displaying a process operation, said data representing a run period and a non-run period of each process, from said first event, and
        creating inter-process communications data from said second event, said inter-process communications data being formed of a pair of a transmission process and a transmission time and a pair of a reception process and a reception time in inter-process communications;
    said manifesting further including:
        manifesting the run period and the non-run period of each process in a chronological order, and
        manifesting, in one-to-one correspondence, a point represented with a transmission process and a transmission time and a point represented with a reception process and a reception time in each inter-process communications.

3. A computer-readable recording medium that stores therein a computer program for analyzing and displaying an operation of a measured computer system, said computer program being executed by one or more devices, the computer program operative to cause said one or more devices to:
    measure and collect as chronological event trace data a software event occurring within said measured computer system;
    analyze the operation of said measured computer system based on the event trace data collected in said measuring act;
    manifest the operation of said measured computer system analyzed in said analyzing act;
    detect both a first event of changing processes on said measured computer system and a second event of performing inter-process communications and then collect said first and second events as chronological information;
    create data displaying a process operation, said data representing a run period and a non-run period of each process, from said first event, and create inter-process communications data from said second event, said inter-process communications data being formed of a pair of a transmission process and a transmission time and a pair of a reception process and a reception time in inter-process communications;
    manifest the run period and the non-run period of each process in a chronological order; and
    manifest, in one-to-one correspondence, a point represented with a transmission process and a transmission time and a point represented with a reception process and a reception time in each inter-process communications.

4. An apparatus for analyzing and displaying software events occurring within a computer which executes a program, said apparatus comprising:
    a probe detecting a first event of changing a process and a second event performing inter-process communications while said program is being executed;
    a collecting module collecting as chronological information both the first event of changing said detected process and the second event of performing inter-process communications;
    an analyzer creating process operation data and inter-process communications data, based on said chronological information collected, said process operation data representing a run period and a non-run period of each process, said inter-process communications data representing a transmission process, a transmission time, a pair of a reception process and a reception time in inter-process communications; and
    a display manifesting a run period and a non-run period in each process based on said process operation data created wherein a horizontal axis acts as a time axis and wherein processes are arranged in the direction of a vertical axis and wherein a line is drawn between a time a process is resumed and a time a process is saved and for manifesting transmission and reception between processes in parallel form based on said inter-process communications data created wherein an arrow line is drawn between a transmission time of a transmission process and a reception time of a reception process.

5. A method for analyzing and displaying software events occurring within a computer which executes a program, said method comprising:
- detecting a first event changing a process and a second event performing inter-process communications while said program is being executed;
- collecting as chronological information both the first event of changing said detected process and the second event of performing inter-process communications;
- creating process operation data and inter-process communications data, based on said chronological information collected, said process operation data representing a run period and a non-run period of each process, said inter-process communications data representing a transmission process, a transmission time, a pair of a reception process and a reception time in inter-process communications;
- manifesting a run period and a non-run period in each process based on said process operation data created wherein a horizontal axis acts as a time axis and wherein processes are arranged in the direction of a vertical axis and wherein a line is drawn between a time a process is resumed and a time a process is saved; and
- manifesting transmission and reception between processes in parallel form based on said inter-process communications data created wherein an arrow line is drawn between a transmission time of a transmission process and a reception time of a reception process.

6. A computer-readable recording medium that stores therein a computer analyzing program for analyzing and displaying software events occurring within a measured computer system that executes an application program, the computer analyzing program operable to:
- detect a first event of changing a process and a second event performing inter-process communications while said application program is being executed;
- collect as chronological information both the first event of changing said detected process and the second event of performing inter-process communications;
- create process operation data and inter-process communications data, based on said chronological information, said process operation data representing a run period and a non-run period of each process, said inter-process communications data representing a transmission process, a transmission time, a pair of a reception process and a reception time in inter-process communications;
- manifest a run period and a non-run period in each process based on said process operation data created wherein a horizontal axis acts as a time axis and wherein processes are arranged in the direction of a vertical axis and wherein a line is drawn between a lime a process is resumed and a time a process is saved; and
- manifest transmission and reception between processes in parallel form based on said inter-process communications data created wherein an arrow line is drawn between a transmission time of a transmission process and a reception time of a reception process.

7. The computer-readable recording medium of claim 3, wherein the measured computer system is one of the devices on which the stored computer program is executed.

* * * * *